June 16, 1925.
J. M. MEREDITH
COLLAPSIBLE TIRE RIM
Filed July 10, 1924
1,542,630
2 Sheets-Sheet 1
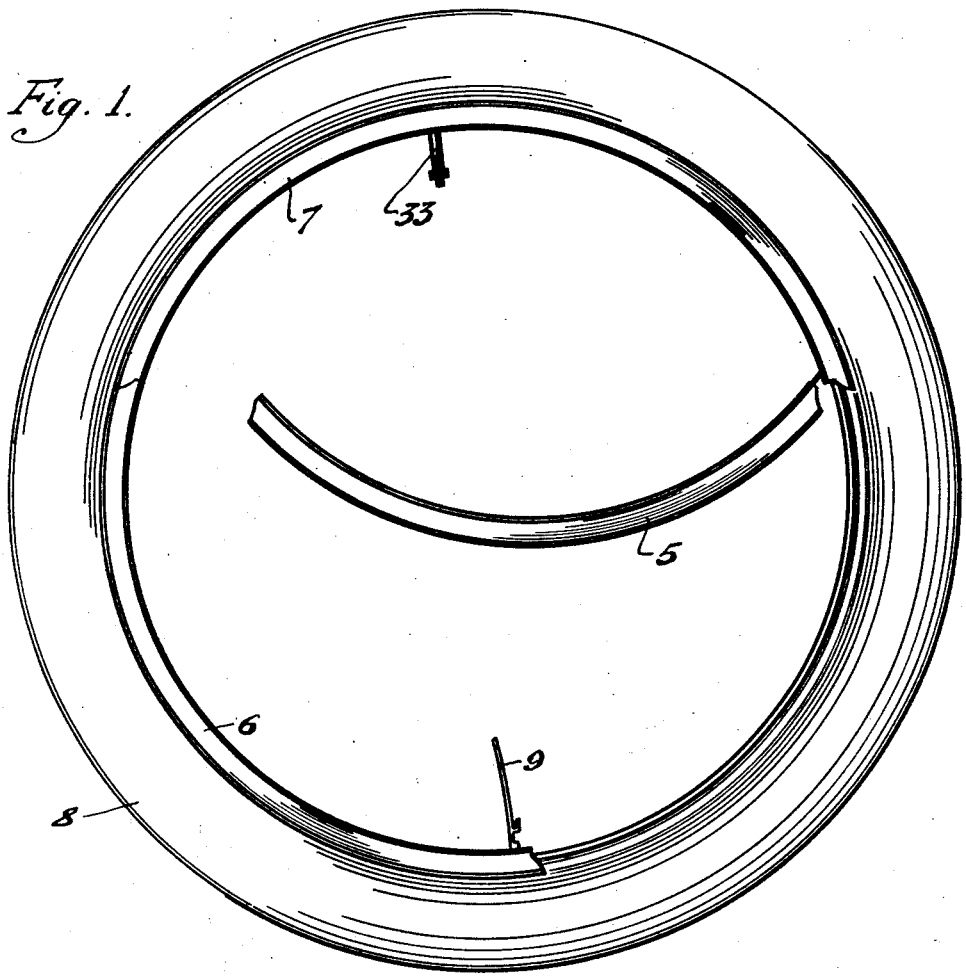
Fig. 1.
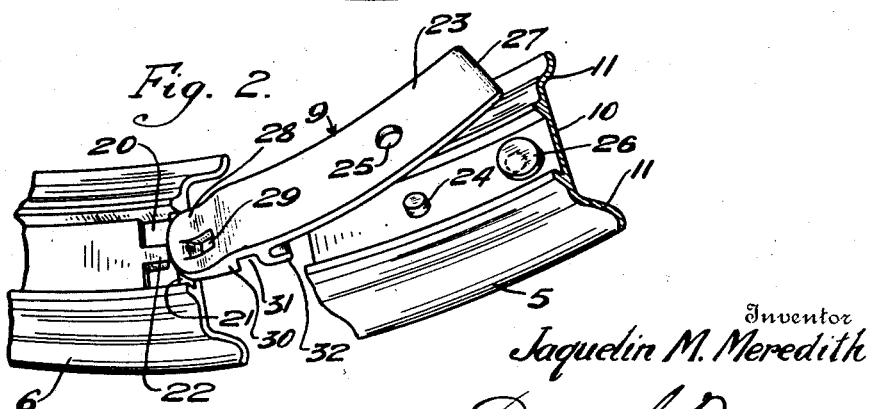
Fig. 2.
Inventor
Jaquelin M. Meredith
By 
Attorney June 16, 1925.
J. M. MEREDITH
COLLAPSIBLE TIRE RIM
Filed July 10, 1924
1,542,630
2 Sheets-Sheet 2
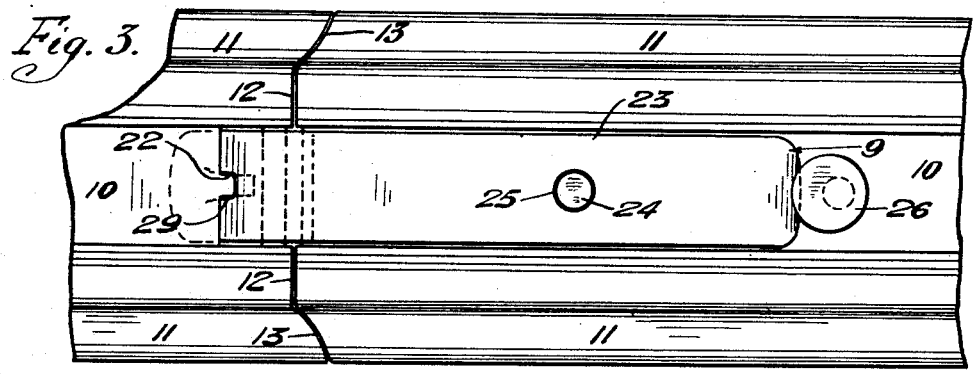
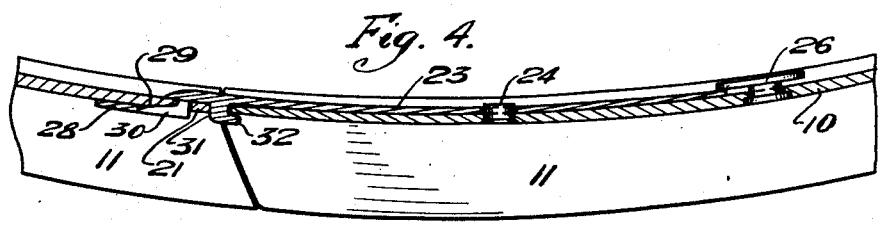
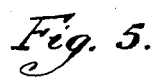
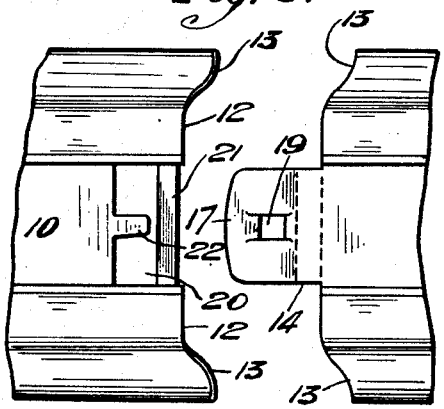
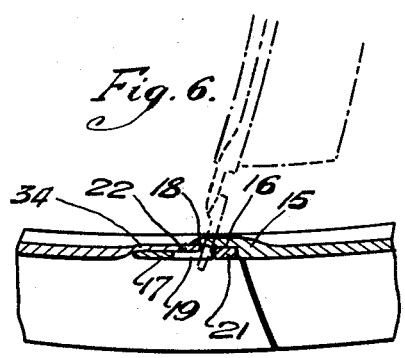
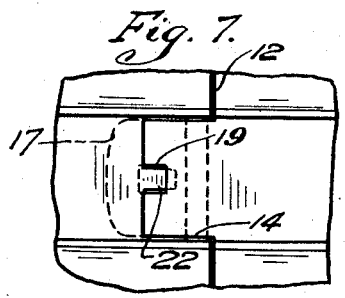
Inventor
Jaquelin M. Meredith
By
Attorney Patented June 16, 1925.

1,542,630

UNITED STATES PATENT OFFICE.

JAQUELIN M. MEREDITH, OF NORFOLK, VIRGINIA, ASSIGNOR OF ONE-THIRD TO HARRY C. INMAN, OF BERWYN, MARYLAND, AND ONE-THIRD TO TEMPLE A. NUCKOLS, OF NORFOLK, VIRGINIA.

COLLAPSIBLE TIRE RIM.

Application filed July 10, 1924. Serial No. 725,281.

*To all whom it may concern:*

Be it known that I, JAQUELIN M. MEREDITH, a citizen of the United States, residing at Norfolk, in the county of Norfolk and State of Virginia, have invented new and useful Improvements in Collapsible Tire Rims, of which the following is a specification.

This invention relates to improvements in collapsible tire rims and particularly to joint means for effectively locking the ends of a cross cut demountable rim. The present invention embodies a further development and improvement over the structures disclosed by my Patents Nos. 1,362,433, Dec. 14, 1920; 1,415,670, May 9, 1922, and 1,447,804, March 6, 1923.

The primary object of the present improvement is to provide a simplified means whereby a tire rim may be formed in separable sections which have terminal devices and structural features that will form flush joints with the opposing inner and outer surfaces of the rim and also permit the meeting ends of the sections to be swung inwardly after the rim has been detached from the felly of the vehicle wheel to facilitate removal of the tire.

A further object of the invention is to provide a locking joint between the meeting ends of the sections of a collapsible demountable rim for a tire and secure the said ends against accidental circumferential separation or radial displacement when the rim is in use, the sections being particularly held against displacement relatively to one another in an edgewise direction and also having a practically smooth surface at the location of the end joints when the sections are connected and locked and in distended positions.

A further object of the invention is to provide a novel form of locking joint for sections of a demountable collapsible rim that will be maintained against separation, though free from movement when the rim is demounted during ordinary usage in connection with a wheel felly, to adapt the improved rim for ready adjustment to disengage the same from the tire and also when applying it to a tire, and moreover, to permit the several sections to be easily separated or disjointed for compact arrangement for transportation, shipping or storage purposes.

With these and other objects and advantages in view, the invention consists in the construction and arrangement of the several parts which will be more fully hereinafter described and claimed.

In the drawings:

Fig. 1 is a side elevation of a tire of the usual inflatable type having the improved rim mounted therein and shown partially open or collapsed.

Fig. 2 is a detail perspective view of the adjacent extremities of the rim sections, showing the improved features of construction and the locking key or member therefor.

Fig. 3 is a plan view of portions of sections of the improved rim, showing the locking key or member in applied position and held against disengagement.

Fig. 4 is a longitudinal vertical section of the structure shown by Fig. 3.

Fig. 5 represents plan views of adjacent extremities or meeting ends of sections of the improved rim, showing the connecting means therefor.

Fig. 6 is a longitudinal vertical section of the meeting ends of two of the sections shown joined and illustrating in dotted lines the position of one section end with relation to the other in locking or separating the two ends.

Fig. 7 is a plan view of the meeting ends of two of the sections of the improved rim, showing the members of the locking joint in engagement.

The numerals 5, 6 and 7 designate the segments or sections of a collapsible rim, which are adapted to be applied to the felly of a wheel and constructed in accordance with the features of the invention to facilitate the application and removal of a tire 8. The segments or sections 5, 6 and 7 are locked in distended positions and started in their collapsing movement when it is desired to remove the tire 8 by releasing a main locking lever or member 9, which is separable from the meeting ends of the segments 5 and 6 in accordance with the illustration in the drawings. The present improvement embodies a particular joint connection between the meeting ends of the segments or sections 6 and 7 and 7 and 5, and this same joint connection is also embodied in the construction of the lever 9 and the end of the segment or section 6 opposite that associated with the segment or section 7. This improved joint connection is of such construction that a hinge action of the several segments or sections may be had and will be presently specifically described. The rim as a whole is channeled as in the construction ordinarily adopted in devices of this type, the said channeled rim comprising as its essential components a flat metal central member or body 10 with outwardly flaring flanges 11. At the location of the joints constituting the improvements the flanges 11 are cut through, preferably in the manner clearly shown by Figs. 3, 4 and 5; first, transversely straight as at 12, so as to square the abutting ends of the segments or sections, and then at a curved inclination as at 13, to produce a retention offset which will be materially advantageous in facilitating the assemblage of the meeting terminals or ends of the segments or sections and particularly the flanges 11 and serve to positively retain the cut portions or meeting ends of the flanges in alined association when the rim segments or sections are disposed in normal tire-holding positions or distended, as shown by Figs. 1, 3 and 4. This construction is very similar to that disclosed by my Patent No. 1,447,804, hereinbefore noted. The joint connection consists in forming the one segment or section end with a projecting tongue 14, which is increased in thickness, as at 15, at the portion which projects beyond the segment or section end, to provide for the formation of an under seat or recess 16, beyond which the tongue is reduced in thickness to its free end, as at 17. Between the forward reduced portion of the tongue and the terminal of the enlarged portion 15 an overhanging shoulder 18 is provided at the inner portion of the tongue, and adjacent to this shoulder an angular opening 19, preferably of square form, is cut through the center of the tongue. The tongue 14 as a whole is long enough to project over the adjacent segment or section end and the latter has a transverse slot 20 formed in the body 10 thereof and terminating at the points where the flanges 11 start from the opposite sides of said body. This slot 20 is located a distance inwardly from the end of the segment or section in which it is formed, and by this means a cross bar 21 is provided and serves as an effective means in the joint organization. From the center of the rear wall of the slot 20 a longitudinally disposed projection 22 extends towards the bar 21, said projection 22 being shorter than the width of the slot 20, the distance between the forward free end of the said projection and the adjacent side of the bar 21 being slightly greater than the thickness of the forward reduced portion 17 of the tongue 14. The projection 22 is also of a width less than the maximum width of the opening 19 in the tongue 14, so that the said projection may easily pass into and outwardly from the opening 19 during the operations of assembling and dissociating the tongue 14 relatively to the slot 20, bar 21 and projection 22. The locking lever 9 has a structure very similar to that of the tongue 14, but is a loose device which is separable from the two segments or sections with which it engages. The said lever 9, however, may be held in connection with the one segment or section as shown by Fig. 1, so that it will always be in position for immediate operation and to avoid displacement or loss of the same. This lever 9 comprises a curved shank 23, which conforms to the contour of the portion of the flat body 10 of the segment or section which it engages, the latter segment or section, as for instance the section 5, having a projecting stud 24 to engage an opening 25 in the shank 23 of the lever, and at a distance from the stud 24 an eccentrically mounted turn-button or locking device 26 is held on the flat body 10, to engage the free edge 27 of the shank and thereby lock the lever against accidental movement. The eccentrically mounted turn-button or locking device 26 is freely operable to secure or release the end of the shank 23. The locking extremity of the lever 9 has a reduced tongue 28 with an opening 29 centrally extending therethrough to receive the projection 22 of the adjacent segment or section end, as for instance the end of the segment or section 6. The lever 9 adjacent to the formation of the tongue 28, or where the latter extends from said lever, has a thickened portion 30 with a cross seat or recess 31 formed therein, and in rear of the recess is a rearwardly extending hook or catch 32 to engage under the adjacent end of the flat body 10 of the segment or section 5 to which the lever is secured. The meeting ends of the segments or sections 6 and 7 are respectively provided with the tongue 14, slot 20, cross bar 21 and projection 22, and the meeting ends of the segments or sections 7 and 5 are respectively provided with the slot 20, cross bar 21 and projection 22 and the tongue 14. As hereinbefore described, the meeting ends of the segments or sections 5 and 6 are constructed as shown by Fig. 2 for the application of the lever thereto. To balance the wheel, the nipple having the usual air valve as at 33 is disposd diametrically opposite the location of the lever 9, and while this lever has been described for the purpose of illustration as being applied to the meeting ends of the sections 5 and 6, it will be understood that it may be associated with the meeting ends of other sections instead of the sections specified. Moreover, it will be further understood that instead of using three segments or sections, which is preferable, the rim may embody a greater number of sections all constructed and arranged at their meeting ends similar to the sections hereinbefore described.

In assembling the segments or sections, each segment or section carrying the tongue 14 is turned at an angle, as indicated by dotted lines in Fig. 6, to insert the reduced portion 17 of the tongue through the slot 20 until the projection 22 registers with and passes through the opening 19, and the segment or section carrying the tongue is then turned outwardly and in circular alinement with the segment or section with which the tongue is in engagement until the cross bar 21 is sungly fitted in the recess or seat 16, in which position the reduced forward portion or extremity 17 of the tongue 14 will lie under the part of the body 10 of the segment or section engaged adjacent to the tongue 22, this part of the body being reduced in thickness, as at 34, to compensate for a close and flush fitting of the reduced portion 17 of the said tongue 14. All of the parts of this joint organization are closely fitted, so as to avoid any projection especially in the outer or channeled sides of the segments or sections, so that the tire 8 may engage the continuous or unbroken surface and be regularly disposed in connection with the rim. After the segments 6, 7 and 5 have been joined as just explained, the lever 9 is applied by disposing the same at an angle to permit the insertion of the tongue 28 into the slot 20 and engagement of the projection 22 with the opening 29 of the tongue, and when the said lever is turned flat against the body 10 of the segment with which it is associated in locked relation, the bar 21 will enter the recess 22 and the rearwardly extending hook or catch 32 will embrace the adjacent end of the flat body 10. When the lever is pressed flat in locking position, the stud 24 will extend through the opening 22 and the turn-button or locking device 26 will then be rotated to engage the end 27 of the lever and thereby lock the latter against movement. In collapsing the improved sectional rim, the lever is first released and thrown inwardly in the position shown by Fig. 1, thereby liberating one end of the segment or section 5 and permitting the latter to be turned or swung inwardly, and the remaining segments or sections may then be also drawn inwardly and released from the tire. In applying the segments to the inner side of the tire, they will be reduced by moving the same through the medium of the joints hereinbefore explained, or be slightly collapsed and subsequently distended and engaged and locked in connection with the tire.

From the foregoing it will be seen that the improved joint structure, including the locking lever, is very efficient as a means for holding the meeting ends of the tire rim segments or sections in positive assembled relation, and that said ends may be operated or adjusted to have relative movements in relation to the tire, or, as hereinbefore explained, the several segments may be easily disconnected and reduced to compact form for storage or transportation purposes. Moreover, the improved tire rim organization may be readily manipulated to expedite the application thereto or removal therefrom of a tire without injury to the latter and without any liability of deteriorating or disadvantageously affecting portions of the inner tube adjacent to the joints.

What is claimed as new is:

1. A collapsible tire rim composed of a number of segments having joints between adjacent ends, the end of one segment being provided with a projecting tongue having an opening therethrough and an under transverse seat recess in rear of said tongue, and the end of the adjacent segment having a transverse slot with a longitudinal projection extending from the inner side wall thereof and an end cross bar to respectively and separably engage the opening in the said tongue and the said seat recess so as to form a double lock when the segments are normally positioned.

2. A collapsible tire rim composed of a number of segments having joints between adjacent ends, the end of one segment being provided with a fixed tongue projecting centrally therefrom and having an opening therein and the end of the adjacent segment formed with a transverse slot and a projection extending longitudinally from the one side wall of the slot, and a locking lever having a tongue structure at one end similar to the tongues of rim segments, said locking lever being adapted to be separably locked to one of the segments.

3. A collapsible tire rim composed of a number of segments having joints between adjacent ends thereof, the one segment having a slot and a longitudinal projection within the slot and a terminal cross bar at one end towards which the projection extends, the end of the other segment having an under transverse recess and a tongue with an opening therethrough in advance of the said recess to respectively fit over the cross bar and engage the said projection, the tongue having the opening therethrough being flat and reduced in thickness.

4. A collapsible tire composed of a number of segments having joints between adjacent ends of the segments, the one segment being provided with a longitudinally projecting tongue reduced in thickness relatively to the portion of the segment in rear thereof, the said projecting tongue having an opening therethrough and the segment in rear of the tongue being provided with an under transversely extending recess, the end of the opposite segment being formed with a transversely extending slot forming an end bar, a projection extending from the center of the rear wall of the slot towards the bar and of less length than the width of the slot, the tongue also being reduced in thickness relatively to the portion of the segment in rear thereof with which it is formed, the bar fitting in the said recess in rear of the tongue and the projection extending through the opening of the tongue to provide a substantially flat joint when the segments are disposed in normally distended positions.

5. A collapsible tire rim composed of a number of segments having separable hinge joint means between adjacent ends thereof, the one segment having a central longitudinally projecting tongue with an opening therein and the other segment being transversely slotted and having a longitudinal projection within the slot and of less width than the latter to receive and engage the said tongue, and a locking lever having a tongue at one end similar to the tongues of the segments and also provided with a shank having an opening therein, the one segment with which the lever is associated being provided with a stud to engage the opening of the lever shank and also with a locking device to secure the end of the lever shank.

In testimony whereof I have hereunto set my hand.

JAQUELIN M. MEREDITH.